United States Patent [19]

Heizmann

[11] 4,060,906

[45] Dec. 6, 1977

[54] CENTERING APPARATUS FOR SENSING ALIGNMENT OF ENGAGING, ALIGNED MACHINE ELEMENTS, TYPICALLY SCREWS AND BOLTS WITH NUTS

[75] Inventor: Frieder Heizmann, Echichens, Switzerland

[73] Assignee: Robert Bosch G.m.b.H., Stuttgart, Germany

[21] Appl. No.: 715,713

[22] Filed: Aug. 19, 1976

[30] Foreign Application Priority Data

Sept. 11, 1975 Germany ............................ 2540494

[51] Int. Cl.² ............................................. G01B 5/25
[52] U.S. Cl. .................. 33/181 R; 29/240.5; 33/1 M; 33/172 D; 33/DIG. 13
[58] Field of Search .............. 33/1 M, 169 C, 172 D, 33/172 E, 174 L, 174 PC, 181 R, 185 R, DIG. 13; 29/240, 240.5; 81/54, 55, 56

[56] References Cited

U.S. PATENT DOCUMENTS

| 2,518,009 | 8/1950 | Hess | 29/240 |
|---|---|---|---|
| 2,878,576 | 3/1959 | Cramb | 33/181 |
| 3,052,972 | 9/1962 | Steinmeyer | 29/240.5 |
| 3,241,243 | 3/1966 | Speer | 33/1 M |
| 3,250,012 | 5/1966 | Hilton et al. | 33/172 E |

FOREIGN PATENT DOCUMENTS

| 1,049,118 | 8/1953 | France | 33/DIG. 13 |
|---|---|---|---|
| 2,034,635 | 1/1972 | Germany | 33/169 C |
| 365,547 | 12/1962 | Switzerland | 33/169 C |

*Primary Examiner*—Richard E. Aegerter
*Assistant Examiner*—Richard R. Stearns
*Attorney, Agent, or Firm*—Flynn & Frishauf

[57] ABSTRACT

A conical centering feeler is located in axial alignment with the central axis of one of the elements and has its pointed end directed towards the other. If the other element is a nut, for example, the point is directed towards the bore in the nut. If the other element is a bolt, the conical element is hollow and the hollow, wide rim is placed over the bolt. The conical element is held by a flexible deflection tube which is connected to sensors, for example strain gauges, located 90° offset with respect to each other, which, upon bending of the tube, indicating misalignment of the elements, cause feed operation of a cross slide until the bending tube is straight, thus indicating alignment of the two elements. The bending tube holds the conical element in alignment with its point.

13 Claims, 3 Drawing Figures

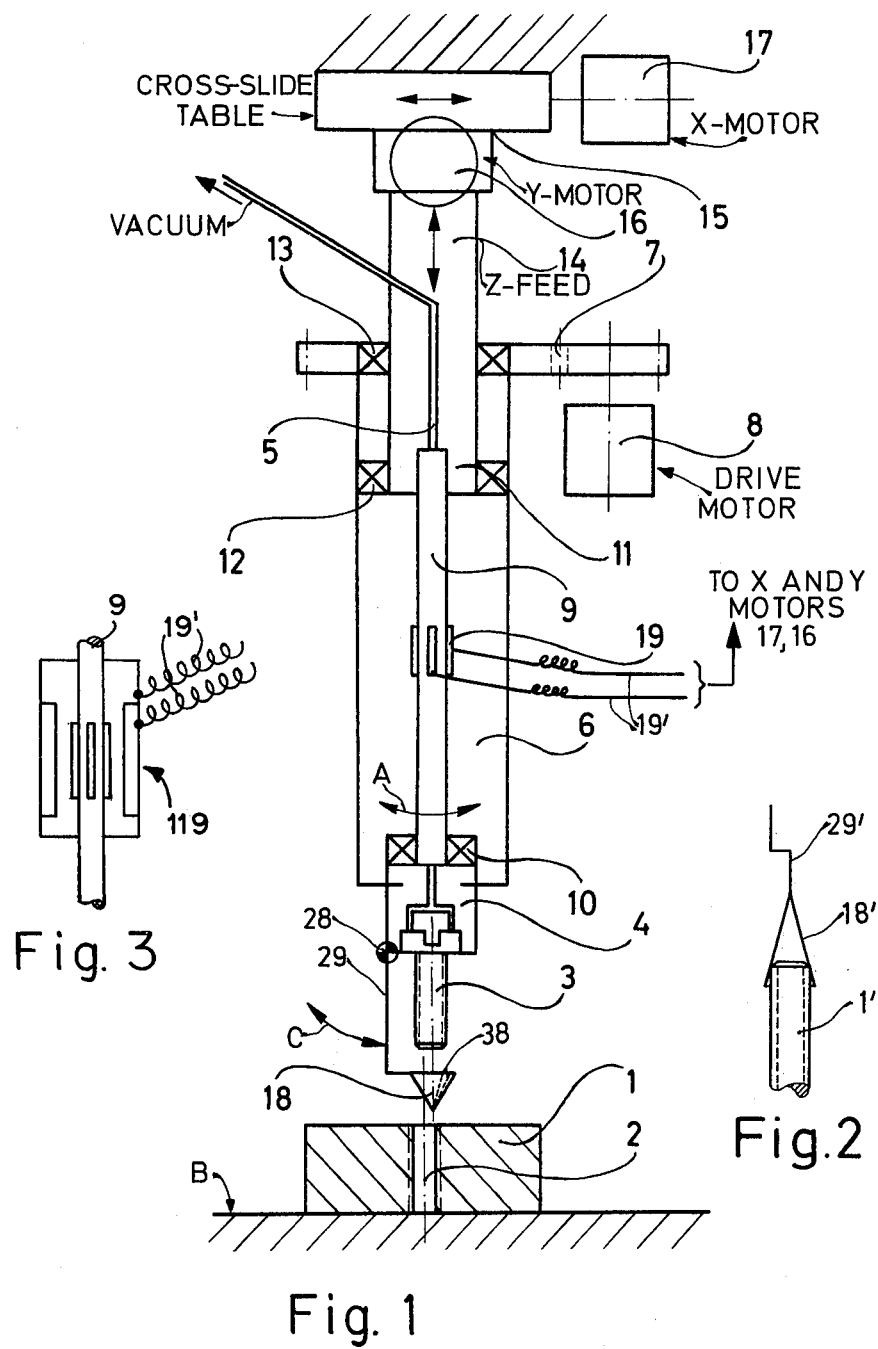

CENTERING APPARATUS FOR SENSING ALIGNMENT OF ENGAGING, ALIGNED MACHINE ELEMENTS, TYPICALLY SCREWS AND BOLTS WITH NUTS

The present invention relates to apparatus for centric alignment of engaging, aligned machine elements, for example bolts, screws, pins, and similar elongated machine elements with openings in which they are to fit, for example bores of nuts, machine parts, or the like, and more particularly to permit automatic assembly of such aligned elements with and into each other, in which the machine elements can be positioned radially or laterally with respect to each other and can then be axially introduced.

Assembly stations to assemble nuts and bolts to female threads frequently have the problem that the parts to be assembled together are located with respect to each other by locating apparatus having positional tolerances which are excessive with respect to the fit between the bolt and the nut. It is then necessary to manually align the elements to be secured together so that the axis of the bolt and the axis of the nut exactly coincide, permitting automatic assembly.

It has previously been proposed to sense specific positions by means of grippers which are controlled by contact and which position objects in accordance with a predetermined pattern. Such contact-sensitive sensing systems are complicated and expensive and their use has been restricted essentially to laboratory installations or to the handling of dangerous objects by remote control, for example to the handling of radioactive materials.

It is an object of the present invention to provide an arrangement for automatic assembly of machine elements with respect to each other in which the elements each have an axis and in which, upon assembly, the axes of the elements must coincide. The apparatus should be suitable for mass production use in the assembly of the elements even if the axial position of one of the elements with respect to the other is not precisely established. The purpose of the apparatus is to automate assembly operations which, heretofore, were carried out manually, specifically the engagement of bolts or screws with nuts. The apparatus should, additionally, be sturdy, inexpensive and suitable for general use in production and assembly environments.

SUBJECT MATTER OF THE PRESENT INVENTION

Briefly, a conical element is provided which is supported on a flexible, elongated holder, for example a bending tube. The conical element is supported with its axis in alignment with the bending tube. If the alignment of the conical element with a bore is to be sensed, then the cone is constructed to project towards the bore of the respective machine element, for example a nut; if alignment with a projection, for example a bolt is to be sensed, then the cone is constructed as a hollow cone, with the open rim facing the bolt. The cone is placed to be in axial alignment with one of the elements and fed to fit therein or thereabout. Deflection of the flexible holder for the cone is sensed, and sensing signals are derived which control a suitable positioning system, for example motors connected to a cross slide, until the deflection signals all are null, indicating axial alignment of the cone with respect to its engaged element. The cone is then removed, for example by lifting and flipping it laterally — an operation which can be carried out under automatic control sequencing — and the machine elements then will be in appropriate alignment for axial feed and engagement thereof.

The apparatus thus permits, in simple manner, securing two machine elements, such as bolts and nuts, by bringing their respective axes into congruence. Assembly will thus be simple and exact. If the parts are offset with respect to each other by a few millimeters, for example, and which may well be within the tolerance limits of many positioning systems, then the cone is deflected with its point from the center of the engaged machine element, thus bending the deflecting holder, for example the deflection tube. The direction and extent of the bend of the deflection tube is electrically sensed, for example by means of a strain guage array, and the resulting electrical signals are used to control radial or lateral positioning of the one or the other of the machine elements until the bend of the deflection element is eliminated or is within a predetermined and acceptable tolerance limit. Thereafter, the two elements can be joined, for example a bolt and nut assembled together.

Radial centering can be effected by suitable automatic cross slide feeds, as well known, under control of known automatic servo systems.

The invention will be described by way of example with reference to the accompanying drawings, wherein:

FIG. 1 is a general schematic diagram of the centering apparatus illustrating assembly of a screw to a nut;

FIG. 2 is a highly schematic fragmentary illustration showing association of the centering cone with a bolt; and FIG. 3 is a fragmentary, schematic illustration showing an inductive, or capacitative transducer arrangement.

A fixed machine element 1, secured or fixedly positioned to a base B, is formed with a threaded bore 2. The machine element may, for example, be a nut or nut element. A bolt 3 is to be screwed into the threaded bore 2 of nut 1. The bolt 3 is held at a boring head 4. It is held in position by a vacuum, applied through a vacuum line 5. Other holding means, for example magnetic heads and the like may be used.

The head 4 is driven by engagement with a cylinder 6 which is keyed to a gearing 7 in drive connection with a motor 8. The interior of the cylinder 6 is hollow. Only the outer wall of the cylinder 6 is shown, schematically, in the figure. A bending tube 9 is located within the hollow cylinder 6, secured at its lower end 10 with the head 4. The upper end of the bending tube 9 is secured to a sleeve 11 which is connected by ball bearings 12, 13 to the upper end of the cylinder 6.

The sleeve 11 is connected to a vertical or z-axis feed, schematically illustrated only by the double arrow 14, and may include any one of manual or automatic vertical feeds, well known. Further, sleeve 11 is attached to a cross slide 15, driven by an x-axis motor 17 and a y-axis motor 16, to permit positioning of cross slide table 15 in two perpendicular directions.

The axial alignment of the axis of bore 2 is sensed by a centering cone 18. Cone 18 is held by a holding rod 29, which can be pivoted at pivot 28 where it is attached to the head 4. Holder 29, additionally, may include a vertical telescoping slide, maintaining the holder in at least one extended, locked position, for example by a ball-and-detent catch. A sensing system formed of four strain guage strips 19, and carried out to electrical lines 19', is secured to the bending tube 9. The signals obtained at lines 19' are used to control the x-axis and the y-axis motors 17, 16. These signals can be evaluated, for example, by suitable bridge circuits, and amplified by servo amplifiers. If, instead of a bolt 3 to be secured to a nut 1, a nut is to be secured to an upstanding bolt, then the cone will be formed as shown in FIG. 2, that is, will be provided as an open, internally hollow cone 18' secured to a holder 29'. The open diameter of cone 18' should be larger than the diameter of the upstanding bolt 1' which can be expected.

OPERATION

Bolt 3 is placed in head 4. After insertion of the bolt, the cone 18 is flipped downwardly in the position shown in FIG. 1. The z-axis feed 14 is started to move the entire apparatus vertically downwardly. FIG. 1 illustrates the apparatus holding the bolt 3 offset axially with respect to the axis of bore 2. Upon engagement of cone 18 with the bore 2 of nut 1, the cone is deflected laterally, see arrow A. The initial positioning must, of course, be such that the offset is at the most equal to half of the diameter of the bore 2. Lateral deflection of the cone 18 causes bending of the tube 9, so that the strain gauge elements 19 provide output signals over line 19' which are connected to the cross slide motors 16, 17 of suitable sign and magnitude. When the signals from the lines 19' are all null, the axes of the bolt 3 and of nut 1 are congruent. Cone 18 can then be retracted and flipped out of position, see arrow C, and bolt 3 screwed into the bore 2 of nut 1 by energizing motor 8.

Four strain gauge elements 19, distributed respectively offset from each other by 90° with respect to the circumference of tube 9, provide excellent sensors to sense deflection of the tube 9. Other sensing elements may be used, for example capacitative or inductive sensors (119 FIG. 3) which sense deflection of tube 9. Such transducers are well known.

The cone 18 is removed from engagement with nut 1 by longitudinal movement in the direction of the holder 29, or 29', respectively, and/or flipping it out of the way. It is also possible to construct the cone in segments, as schematically indicated by lines 38, similar to a boring chuck. Thus, the cone 18 may be formed, for example, of three elements which can be radially collapsed, similar, for example, to a drill chuck, controlled by an eccenter cam ring. The attachment of the cone 18, 18' to the head 4 must be sufficiently stiff so that it does not yield at the force required to deflect the tube 9. The head 4 is located, with respect to cylinder 6, to permit lateral deflection as indicated by arrow A, while being locked for rotation with respect thereto; thus, as soon as the cone 18 is removed when the center has been established, motor 8 can be energized to attach bolt 3 and nut 1.

The vacuum line 5 is particularly suitable since the bolt can be held without any mechanical elements; the only requirement is the presence of a vacuum of greater holding capability than the weight of the machine element to be attached, in this case bolt 3.

If the assembly operations have to be carried out under particularly dirty or contaminated conditions, it may be desirable to attach cone 18 to its holder 29, and cone 18' to its holder 29', respectively, to be rotatable, and to rotate the cone 18, 18' during location thereof with respect to the associated machine element, the central axis of which is to be determined.

Other positioning systems than x-y-controlled cross slide tables may be used, and as well known in the machine tool field.

The system as described is simple and eminently suitable for use in many assembly operations, by permitting automation of assembly steps which, previously, had to be carried out manually, to provide for proper alignment.

Various changes and modifications may be made; for example, instead of providing a collapsible cone 18, the cone 18' may be made to spread, by forming it as a plurality of segments with slits therebetween. The cone 18, 18' need not be a solid cone but may, itself, be formed of strips or segments arranged, essentially, in conical shape.

I claim:

1. Centering apparatus for centric alignment of engaging, aligned machine elements having a respective projecting part and a matching bore such as bolts, screws and nuts, and comprising movable means (15, 16, 17) holding one of said elements and movable in a plane perpendicular to the axis of said one element in response to input signals to axially align it with the other of said elements and means (14) to axially move said elements with respect to each other, a conical centering feeler (18, 18') carried by said movable means located in axial alignment with the central axis of said one of said elements and having its axis directed towards the other of the elements so that, upon axial movement of the feeler (18, 18'), the other element will engage the conical feeler at a side wall of the cone and deflect the same if misaligned;

laterally flexible means (9) carried by said movable means holding said feeler (18, 18') in said axially aligned position while permitting lateral deflection thereof;

and sensing means (19) operatively associated with said flexible holding means (9) and sensing lateral deflections thereof, and providing deflection output signals, said deflection output signals being connected to said movable means (15, 16, 17) to control said movable means to move until the deflection output signals become zero or null, indicative of axial alignment of said elements.

2. Apparatus according to claim 1, wherein the flexible means is a flexible tube (9).

3. Apparatus according to claim 1, wherein the flexible means is an elongated deflection member (9) of tubular or rod-like shape, and the sensing means (19) comprises four elements, 90° offset with respect to each other about said member.

4. Apparatus according to claim 3, wherein the sensing means are strain gauge strips.

5. Apparatus according to claim 3, wherein the sensing means are inductive transducers.

6. Apparatus according to claim 3, wherein the sensing means are capacitative transducers.

7. Apparatus according to claim 1, further comprising a holding means (4) secured to the movable means to hold said one machine element thereto;

and the conical feeler (18, 18') being adjustably secured to said holding means to move between operative and inoperative positions.

8. Apparatus according to claim 7, wherein said holding means (4) comprises a holding chuck (4) rotatably mounted on the laterally flexible means.

9. Apparatus according to claim 7, further comprising vacuum duct means (5) extending through said holding means and terminating adjacent the element to be held thereby, said vacuum duct means being connected to a source of vacuum to hold the said element in said holding means.

10. Apparatus according to claim 1, wherein the conical feeler (18, 18') comprises a plurality of radial segments having a common center or point, the center or point of the conical feeler being congruent with the axis of said one of said elements (3) with which the conical feeler is in alignment.

11. Apparatus according to claim 1, wherein the conical feeler (18, 18') is rotatably mounted on said movable means to rotate about its axis.

12. Apparatus according to claim 1, wherein the other of said elements has a bore and said conical centering feeler comprising a cone having its pointed end directed towards said bore to engage in said bore and seat therein.

13. Apparatus according to claim 1, wherein the other of said element comprises a rod-like projecting element and said conical centering feeler (18') comprises a hollow cone having its open, wide end facing said projecting element to fit thereover and to be centered thereby.

* * * * *